United States Patent [19]
Cartwright

[11] 3,713,186
[45] Jan. 30, 1973

[54] WHEEL STAKE
[75] Inventor: Robert S. Cartwright, Booneville, N.C.
[73] Assignee: Stewart-Warner Corp., Chicago, Ill.
[22] Filed: March 12, 1971
[21] Appl. No.: 123,565

[52] U.S. Cl. .................................................... 16/45
[51] Int. Cl. ............................................ A47b 9/100
[58] Field of Search.16/45, 46; 301/111, 112, 63 PW

[56] References Cited

UNITED STATES PATENTS

| | | | |
|---|---|---|---|
| 3,210,795 | 10/1965 | Fontana et al. | 16/43 |
| 2,688,960 | 9/1954 | Fischer et al. | 16/47 |
| 3,177,516 | 4/1965 | Price et al. | 16/18 A |
| 1,929,743 | 10/1933 | Jarvis et al. | 16/38 |

FOREIGN PATENTS OR APPLICATIONS

| | | | |
|---|---|---|---|
| 249,376 | 11/1960 | Australia | 16/45 |
| 993,928 | 5/1964 | Great Britain | 16/18 A |

*Primary Examiner*—Casmir A. Nunberg
*Attorney*—Augustus G. Douvas, William J. Newman and Norton Lesser

[57] ABSTRACT

The following specification describes a two-wheeled caster in which the shaft rotatably supporting the caster wheels at opposite ends has a head at each end of smaller diameter than the shaft with a peripheral groove between each head and the adjacent main portion of the shaft to define a shoulder. The shaft engages in a correspondingly sized recess in each caster wheel with each recess terminating in a small diameter recess for receiving the respective shaft head. A thin wall section located between each small diameter caster recess and the adjacent shaft receiving recess is deformed into the groove to rotatably secure the shaft to each caster wheel.

2 Claims, 5 Drawing Figures

PATENTED JAN 30 1973
3,713,186
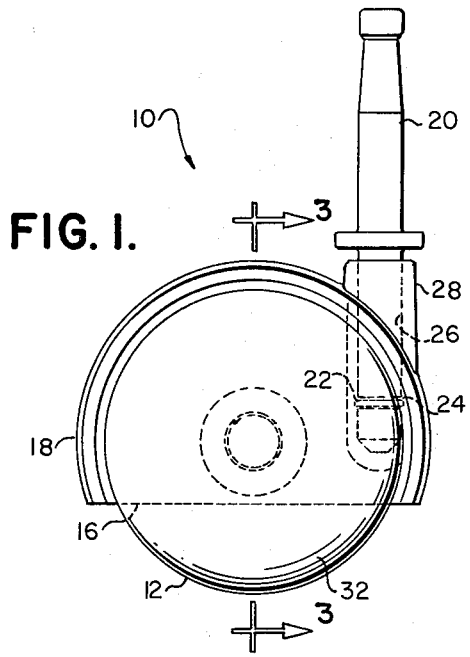
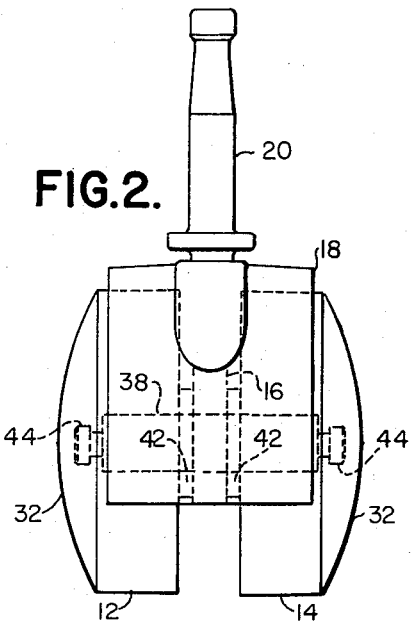
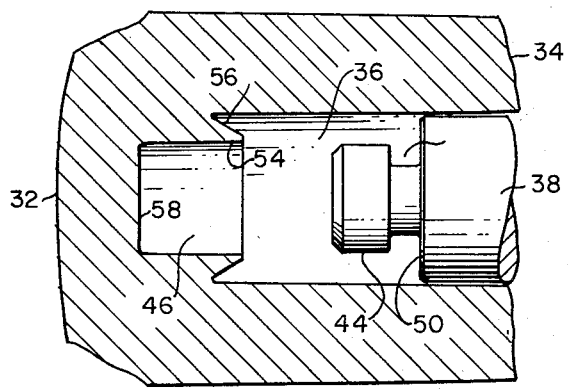
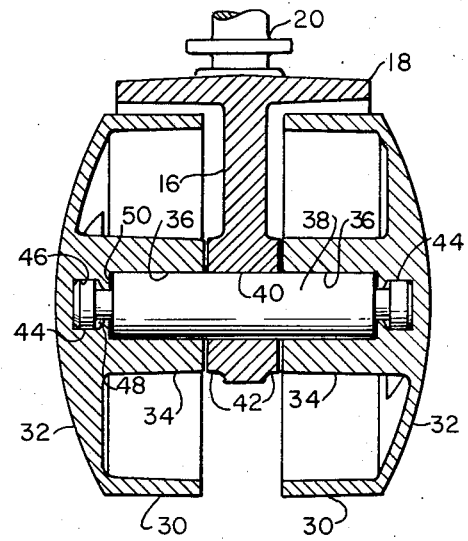
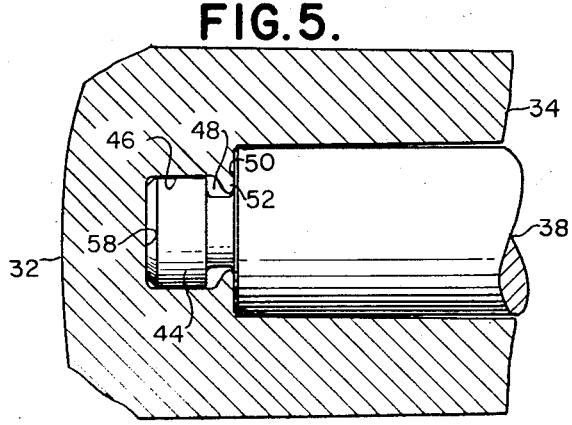
INVENTOR
Robert S. Cartwright
By *Norton Lesser*
Attorney

WHEEL STAKE

BACKGROUND OF THE INVENTION

1. Field of the Invention

This invention relates in general to a method or arrangement for securing a member rotatably to a support, and more particularly to an economical and reliable two-wheeled caster.

2. Description of the Prior Art

An arrangement for rotatably securing each wheel of a two-wheeled caster to opposite ends of a common shaft is shown in U.S. Pat. application Ser. No. 66,230, filed Aug. 24, 1970. In that application a bushing is rotatably positioned at opposite shaft ends and a C-ring fitted in a groove adjacent each shaft end holds the bushings in position. The wheels are then press fit over the bushings so that each wheel is then rotatably secured to the shaft. The arrangement described in the aforementioned application, therefore, required a bushing and a C-ring together with attendant assembly procedures.

SUMMARY OF THE INVENTION

The present invention simply provides a first bore or recess in each wheel for rotatably receiving the shaft and a second smaller diameter bore at the end of the first bore for receiving a relatively small diameter head at each shaft end. A thin lip or wall portion of progressively greater thickness is located between the two bores in each wheel and is engaged by the shoulder on the shaft formed between the large and diameter shaft portion and the head. Axial pressure applied between the shaft and wheel deforms the wall portion into a groove formed between the head and the large diameter shaft portion to prevent axial separation between the shaft and wheel.

The above and other objects of the invention will become apparent on examination of the following specification and claims together with the drawings.

BRIEF DESCRIPTION OF THE DRAWINGS

FIG. 1 is a side elevational view of a two-wheeled caster;

FIG. 2 is a rear elevational view of the two-wheeled caster shown in FIG. 1;

FIG. 3 is a sectional view taken along the line 3—3 in FIG. 1;

FIG. 4 is an enlarged fragmentary view illustrating the insertion of the shaft in one of the wheel bores; and FIG. 5 is an enlarged fragmentary view illustrating the shaft rotatably secured relative the wheel.

DESCRIPTION OF THE PREFERRED EMBODIMENT

In FIG. 1 a caster is indicated by the reference character 10. The caster 10 comprises a pair of wheels 12 and 14 spaced on opposite sides of a central radial wall 16. An arcuate hood wall 18 is formed along the periphery of wall 16 and axially overlaps the periphery of each caster wheel 12 and 14 along the upper portion thereof for a distance exceeding 180°.

The caster 10 is conventionally attached to a furniture leg or other apparatus (not shown) by means of a stem 20. The stem 20, as explained in the aforementioned application has a groove 22 adjacent the lower stem end and in which an expandable C-ring 24 is fitted. The lower stem end is tapered to facilitate expansion of the C-ring for engagement in groove 24. The stem 20 is seated in a blind hole or recess 26 formed in a short annular boss 28. Boss 28 is integrally formed on the hood wall 18 with the recess 26 extending through the hood wall 18 and into an enlarged portion of the radial wall 16 to define a rotatable axis for the stem offset from the axis of wheels 12 and 14. The recess 26 terminates in an end wall that serves to engage the stem end and receives the axial thrust of the stem at a position generally coplanar with the axis of wheels 12 and 14. The periphery of the C-ring 24 engaging the wall of the recess 26 serves to prevent the walls 16 and 18 from disengaging from the stem 20.

The caster wheels 12 and 14 may be of a ferrous or nonferrous material such as aluminum, brass or plastic and are generally cup-shaped so as to define a rim wall 30 for engaging the floor or ground plane and an exterior spherically shaped interconnecting back wall 32. The walls 30 and 32 present smooth exterior surfaces for the caster. An axially extending annular central hub 34 is provided on the back wall 32 of each wheel with each hub projecting toward the radial wall 16. Each hub 34 is provided with a central blind bore or recess 36 for rotatable engagement with a respective main diameter portion of a common ferrous or steel shaft 38.

The shaft 38 is knurled adjacent its mid-portion and press fit in an opening 40 formed in a hub portion 42 of the radial wall 16 adjacent the lower edge of wall 16 so that both the wall 16 and the hub portion 42 are hidden by the wheels. The shaft 38 is provided with a head 44 at each end.

Each head 44 is of smaller diameter than the main portion of the shaft 38 and projects into a corresponding sized bore or recess 46 formed at the end of each bore 36. A peripheral recess or groove 48 is formed between each head 44 and the main portion of shaft 38 to define a radial shoulder 50 of relatively large area at each end of the main portion of the shaft 38. A wall portion or tang 52 integrally formed on each wheel extends into the groove 48 to prevent axial separation of the wheels 12 and 14 from the shaft 38 for retaining the caster in assembled condition.

Each tang 52 is formed from a lip 54 seen in FIG. 4 conical in cross section and located at the receiving end of recess 46 adjacent bore 36. Each lip 54 has an inner diameter corresponding to the diameter of the recess 46 and tapers outwardly in an axial direction from wall 16 to become progressively thicker, as defined by a conical cutaway portion 56 of opposite taper in the body of the wheel between the lip 54 and the diameter of bore 36. The lip 54 is therefore provided with a progressively thicker wall section in the portion approaching recess 46.

Insertion of the shaft 38 into bore 36 to assemble one or both wheels to the shaft proceeds until respective radial wall or shoulder 50 engages the radial wall or lip 54 with head 44 being received in recess 46. Axial pressure then applied between the shaft 38 and the wheel or wheels causes the end of lip 54 adjacent shoulder 50 to deform into the radial passageway or recess 48 to form tank 52, since the portion of lip 54 engaging shoulder 50 is relatively thinner than the remaining lip portion in a radially outward direction. When head 44 engages the end wall 58 of the recess 46, movement is terminated with the lip 54 now forming tang 52 projecting into the radial passageway or groove 48 to prevent axial separation of the wheels and shaft. It will be appreciated that the stem 20 and recess 26 may be formed in a similar manner as shaft 38 and bores 36 and 46, and assembled in a similar manner. It will also be appreciated that a radial wall or shoulder such as 50 may instead be formed between recesses 46 and 36 on hub 34 together with a radially outwardly extending groove, and by forming a lip 54 on the appropriate portion of shaft 38, the lip 54 may be deformed into the radially outwardly extending hub groove or passageway to lock the shaft against axial movement.

Thus, the caster presents an appearance in which all exterior surfaces are smooth with both the wheel and stem connections being hidden and both the hood wall 18 and wheels 12 and 14 serving to camouflage the radial wall 16 while permitting the economical assembly and fabrication of the wheels and stem.

The foregoing is a description of an improved two-wheeled caster whose inventive concepts are not limited by the foregoing and believed to be set forth in the accompanying claims.

What is claimed is:

1. A caster comprising a pair of metal wheels each having an axial recess of one diameter terminating in an axial recess of smaller diameter, a metal shaft corresponding in diameter to said one diameter recess for receipt in each one diameter recess to rotatably support said wheels and having a head on each shaft end of a diameter corresponding to each smaller diameter recess for rotatably engaging a respective wheel smaller diameter recess, a radial surface of larger diameter than said head intermediate each said head and the adjacent shaft portion, said shaft having a peripheral groove intermediate said head and radial surface, and an axially projecting peripheral lip integrally formed on each said wheel intermediate the respective recesses for engagement with a respective shaft radial surface to permanently deform a respective wheel lip into a respective shaft groove in response to axial pressure of the respective radial surface against a respective lip to thereafter prevent axial separation of said shaft and wheels, each lip having an inner diameter corresponding to the respective wheel diameter recess and an outer diameter of increasing radial dimension in an axial direction extending toward said smaller diameter recess.

2. A caster comprising a pair of spaced cup-shaped metal wheels each having a central axial hub in which a first axial recess is formed terminating in an axially aligned recess of smaller diameter, a common metal shaft of one diameter corresponding to said first recess for receipt in each first recess to rotatably support each wheel with said shaft having a groove adjacent each end to define a shoulder adjacent each groove and terminating in a head at each end of larger diameter than said groove and corresponding in diameter to said smaller diameter recesses for receipt in a respective small diameter recess, a lip integrally formed intermediate each said first and smaller diameter recesses on each wheel for engagement with a respective shoulder to enable deformation of each lip into a respective groove in response to axial pressure of said shoulder against said lip to prevent axial separation of said shaft and wheels, each lip being defined by an inner surface having a diameter corresponding to said smaller diameter recess and an outer diameter increasing in the axial direction of said smaller diameter recess, a radial wall between said wheels in which said shaft is press fit, an arcuate hood wall integrally formed on the periphery of said radial wall and overlapping solely a portion of the periphery of said wheels, a boss integrally formed on said hood wall with said boss having a last recess extending through said hood wall and into said radial wall along an axis transverse to and offset from the axis of said shaft, a stem received in said boss recess, means on said stem received in said last recess for engagement with the periphery of said last recess to hold said stem in said last recess.

* * * * *